United States Patent Office 3,078,290
Patented Feb. 19, 1963

3,078,290
DIHYDROCARBONTIN SALTS OF
CARBOXY MERCAPTALS
Ingenuin Hechenbleikner, Kenwood, Robert E. Bresser, Sharonville, and Otto A. Homberg, Woodlawn, Ohio, assignors to Carlisle Chemical Works, Inc., Reading, Ohio, a corporation of Ohio
No Drawing. Filed Apr. 17, 1961, Ser. No. 103,256
8 Claims. (Cl. 260—429.7)

The present invention relates to novel thioacetals and thioketals and their use as stabilizers for halogen-containing resins.

It is an object of the present invention to prepare novel thioacetals and thioketals.

Another object is to prepare novel dihydrocarbon tin salts of acids having a thioketal or thioacetal group.

A further object is to extend the heat and light stability of halogen-containing resins.

An additional object is to provide novel stabilized vinyl resin compositions.

Yet another object is to provide novel synergistic stabilizers for halogen-containing resins.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In one form of the invention there are prepared dihydrocarbon tin salts of acids having a thioacetal or thioketal grouping. Such compounds belong to one of the following groups (I)
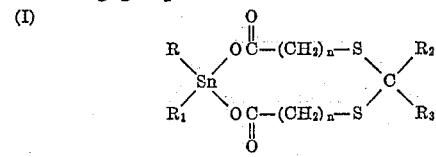

or
(Ia)
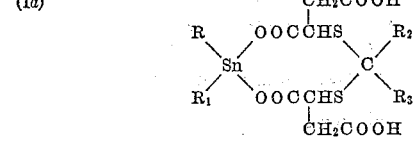

where $n$ is an integer from 1 to 8, R and $R_1$ are alkyl, aralkyl or aryl and $R_2$ and $R_3$ are hydrogen, alkyl, alkenyl, aralkyl, aryl, hydroxyaryl, alkoxyaryl or taken together complete a cyclohexane ring, i.e. the pentamethylene radical.

(II)
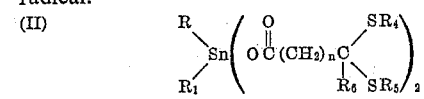

where $n$, R and $R_1$ are as defined above, $R_4$ and $R_5$ are alkyl, aralkyl, aryl, mercaptocarboxylic acid or mercaptocarboxylic acid ester and $R_6$ is hydrogen, alkyl benzyl or aryl.

(III)
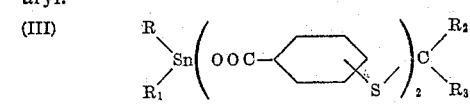

where R, $R_1$, $R_2$ and $R_3$ are as defined above.

(IV)
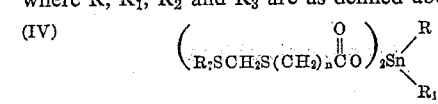

where $n$, R and $R_1$ are as defined above and $R_7$ is alkyl, aralkyl or aryl.

(V)
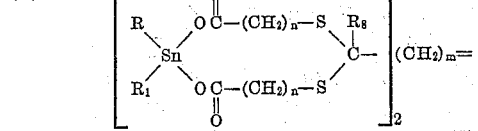

where R, $R_1$, and $n$ are defined as above, $R_8$ is alkyl, aralkyl or aryl and $m$ is an integer from 0 to 8.

In another form of the invention certain thioacetals and thioketals are mixed with dihydrocarbon tin oxides or sulfides.

The thioacetals and thioketals have the following formulae:

(VI)
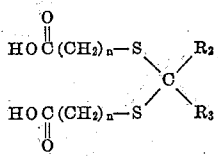

or
(VIa)
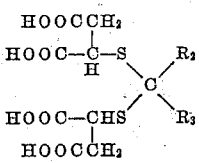

(VII)
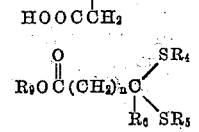

(VIII)
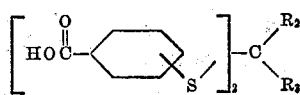

(IX)
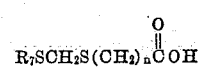
$$R_7SCH_2S(CH_2)_nCOOH$$

(X)
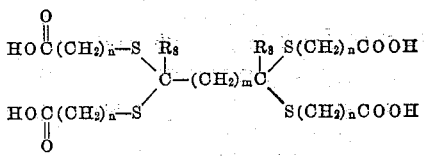

In Formulae VI through X the definitions of $m$, $n$, $R_2$, $R_3$, $R_4$, $R_5$, $R_6$, $R_7$ and $R_8$ are the same as those defined above and $R_9$ is hydrogen or alkyl.

As the dihydrocarbon tin oxide or sulfide there can be used dimethyl tin oxide, dibutyl tin oxide, dioctyl tin oxide, dilauryl tin oxide, butyl lauryl tin oxide, dioctadecyl tin oxide, diphenyl tin oxide, dimethyl tin sulfide, dibutyl tin sulfide, dioctyl tin sulfide, dilauryl tin sulfide, diphenyl tin sulfide, dioctadecyl tin sulfide, dicyclohexyl tin oxide, etc.

Typical examples of compounds in group I are dibutyl tin propane-2,2-bis (mercaptopropionate)

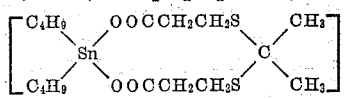

dibutyl tin benzaldi (mercaptoacetate), dibutyl tin benzaldi (mercaptopropionate), dibutyl tin 2-hydroxybenzaldi (mercaptopropionate), dineopentyl tin propane-2,2-bis (mercaptopropionate), dibutyl tin isodecane 1,1-bis (mercaptopropionate), dioctyl tin propane 2,2-bis (mercaptopropionate), dibutyl tin cyclohexyl 1,1-bis (mercaptopropionate), dimethyl tin propane 1,2-bis (omega mercaptooctanoate), dioctadecyl tin methane bis (mercaptoacetate), diphenyl tin propane 2,2-bis (mercaptopropionate), dibutyl tin propene 3,3-bis (mercaptopropionate), butyl lauryl tin phenylacetaldi (mercaptoacetate), dihexyl tin 2-butene-1,1-bis (mercaptopropionate), dibutyl tin diphenyl methane bis(mercaptopropionate)

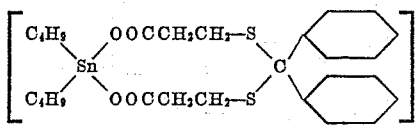

dibenzyl tin propane-2-mercaptoacetate-2-mercaptopropionate, dibutyl tin 2-hydroxy-4-methoxybenzaldi (mercaptobutyrate) and dibutyl tin propane 2,2-bis (mercaptosuccinate).

Typical examples of compounds in group II are dibutyl tin di [4,4-bis (dodecylthio) valerate]

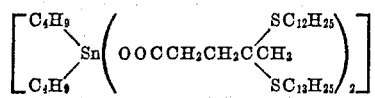

dibutyl tin di [4,4-bis (phenylthio) valerate], dioctadecyl tin di [4,4-bis (phenylthio) valerate], dioctyl tin di [4,4-bis (carboxyethylthio) valerate], butyl octyl tin di [4,4-bis (carbobutoxyethylthio) valerate], dimethyl tin di [4,4-bis (dodecylthio) valerate], dioctyl tin di [ethyl 3,3-bis (carboxyethylthio) butyrate]

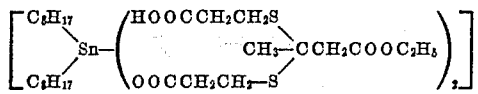

diphenyl tin di [3,3-bis (benzylthio)-3-phenyl propionate].

Typical examples of compounds in group III are dibutyl tin 2-hydroxybenzaldi (2'-mercaptobenzoate), dibutyl tin propane-2,2-bis (2'-mercaptobenzoate)

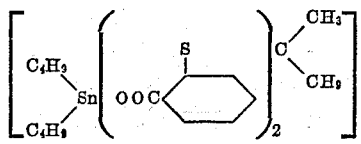

diphenyl tin methane-bis (4-mercaptobenzoate), dilauryl tin diphenyl methane bis (3-mercaptobenzoate), dimethyl tin ethane-1, 1-bis (2'-mercaptobenzoate).

Typical examples of compounds in group IV are dibutyl tin di (dodecylthiomethyl thioacetate)

[(C₄H₉)₂Sn(OOCCH₂SCH₂SC₁₂H₂₅)₂]

dilauryl tin di (methylthiomethyl-thiopropionate), dimethyl tin di (phenylthiomethyl-thiooctanoate), diphenyl tin di (benzylthiomethyl-thioacetate).

Typical examples of compounds in group V are di (dibutyl tin) ethane 1,1,2,2-tetrakis (mercaptopropionate)

di (dioctyl tin)-1-methyl ethane 1,1,2,2-tetrakis (mercaptoacetate), di (diphenyl tin) butane-1,1,4,4-tetrakis (mercaptopropionate), di (dilauryl tin) hexane-1,1,6,6-tetrakis (mercaptooctanoate).

Typical examples of compounds in groups VI and VIa are benzaldi (mercaptoacetic acid), benzaldi (mercaptopropionic acid), 2-hydroxybenzaldi (mercaptoacetic acid), 2-hydroxybenzaldi (mercaptopropionic acid), 4-hydroxy-3-methoxy-benzaldi (mercaptopropionic acid), cyclohexyl-1,1-bis (mercaptoacetic acid), cyclohexyl-1,1-bis (mercaptopropionic acid), methane-bis-(mercaptoacetic acid), methane-bis (mercaptopropionic acid), isodecane-1,1-bis (mercaptoacetic acid), isodecane-1,1-bis (mercaptopropionic acid), propane-2,2-bis (mercaptoacetic acid), propane-2,2-bis (mercaptopropionic acid), 4-methylpentane-2,2-bis (mercaptoacetic acid), butane-2-2-bis (mercaptoacetic acid), diphenylmethane-bis (mercaptopropionic acid), propene-3,3-bis (mercaptopropionic acid), 2-butene-1,1-bis (mercaptopropionic acid), propane-2,2-bis (mercaptosuccinic acid), 2-hydroxybenzaldi (2'-mercaptobenzoic acid), propane-2,2-bis (mercaptooctanoic acid), phenylacetaldi (mercaptoacetic acid), propane-2-mercaptoacetic acid-2-mercaptopropionic acid, and 2-hydroxy-4-methoxybenzaldi (mercaptobutyric acid).

Typical examples of compounds in group VII are 4,4-bis (carbobutoxyethylthio) valeric acid, 4,4-bis (dodecylthio) valeric acid, 4,4-bis (phenylthio) valeric acid, 4,4-bis (carboxyethylthio) valeric acid, ethyl-3,3-bis (carboxyethylthio) butyrate

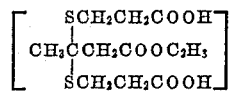

3,3-bis (benzylthio)-3-phenylpropionic acid.

Typical examples of compounds in group VIII are 2-hydroxybenzaldi (2'-mercaptobenzoic acid), propane-2,2-bis (2'-mercaptobenzoic acid), methane-bis (4-mercaptobenzoic acid), methane bis (3-mercaptobenzoic acid), ethane-1,1-bis (2'-mercaptobenzoic acid), phenylmethane bis (2-mercaptobenzoic acid).

Typical examples of compounds in group IX are dodecylthiomethyl mercaptoacetic acid, methylthiomethyl mercaptopropionic acid, phenylthiomethyl mercaptooctanoic acid, benzylthiomethyl mercaptoacetic acid, butylthiomethyl mercaptopropionic acid.

Typical examples of compounds in group X are ethane-1,1,2,2-tetrakis (mercaptopropionic acid), 1-methylethane 1,1,22-tetrakis (mercaptoacetic acid), pentane-2,2,4,4-tetra (mercaptopropionic acid), ethane-1,1,2,2-tetrakis (mercaptoacetic acid), 1,1,4,4-tetrakis-(mercaptopropionic acid) hexane 1,1,6,6-tetrakis (mercaptooctanoic acid).

The compounds in groups VI, VIa, VII, VIII, IX and X can be prepared by any of procedures A to D below.

Unless otherwise indicated all parts are by weight and are expressed in grams.

PROCEDURE A

The aldehyde or ketone and mercaptan are mixed in a 1 to 2 molar ratio. This procedure is particularly effective with mercaptans such as mercaptoacetic acid which are sufficiently strong acids for an exothermic reaction to occur. The product if a solid is air dried. It can be further purified if desired by recrystallization from an appropriate solvent such as water, benzene-hexane mixtures for example. If the product is a liquid it is recovered by stripping off lower boiling materials by vacuum distillation.

PROCEDURE B

This procedure is the same as procedure A except that the reaction is catalyzed by a small quantity of acid, e.g. 1 cc. of concentrated hydrochloric acid.

PROCEDURE C

This procedure is the same as procedure A, except that a small quantity of zinc chloride, e.g. 0.5 gram is used to catalyze the reaction.

PROCEDURE D

A solution of one mole of carbonyl compound and two moles of mercaptan in 200 ml. of toluene was heated under reflux in the presence of a catalytic quantity of acid, e.g. 0.5 gram of p-toluenesulfonic acid until the calculated quantity of water had been collected. The reaction solution was then washed with water, dried and the solvent removed under reduced pressure.

*Example 1*

Using procedure A one mole of benzaldehyde and two moles of mercaptoacetic acid were mixed together. An exothermic reaction occurred. The product was air dried.

It was benzaldi (mercaptoacetic acid) having a melting point of 127° C. and the formula

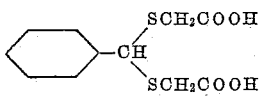

Example 2

Using procedure B one mole of benzaldehyde, two moles of mercaptopropionic acid were mixed together along with one ml. of 37% hydrochloric acid. The product was air dried to yield benzaldi (mercaptopropionic acid) as a waxy solid.

Example 3

Using procedure A one mole of salicylaldehyde and two moles of mercaptoacetic acid were reacted to produce 2-hydroxybenzaldi (mercaptoacetic acid) as a waxy solid.

Example 4

Using procedure B one mole of salicylaldehyde and two moles of mercaptopropionic acid where reacted to produce 2-hydroxybenzaldi (mercaptopropionic acid) as an oil.

Example 5

Using the procedure of Example 2 (procedure B) one mole of vanillin and two moles of mercaptopropionic acid were reacted to produce 4-hydroxy-3-methoxybenzaldi (mercaptopropionic acid) as a solid having a melting point of 124–126° C.

Example 6

Using procedure B (Example 2) one mole of cyclohexanone and two moles of mercaptoacetic acid were reacted to produce cyclohexyl-1,1-bis (mercaptoacetic acid) as a solid having a melting point of 124–129° C.

Example 7

Using procedure B (Example 2) one mole of cyclohexane and two moles of mercaptopropionic acid were reacted to produce cyclohexyl-1,1-bis (mercaptopropionic acid) as a solid having a melting point of 87–91° C.

Example 8

Using the procedure of Example 2 (procedure B) one mole of 37% aqueous formaldehyde and two moles of mercaptoacetic acid were reacted to produce methane-bis-(mercaptoacetic acid) as a solid having a melting point of 119–122° C.

Example 9

Using procedure B (Example 2) one mole of 37% aqueous formaldehyde and two moles of mercaptopropionic acid were reacted to produce methane-bis (mercaptopropionic acid) as a solid having a melting point of 140–141° C.

Example 10

Using procedure A (Example 1) one mole of isodecaldehyde and two moles of mercaptoacetic acid were reacted to produce isodecane-1,1-bis (mercaptoacetic acid) as a liquid.

Example 11

Using procedure B (Example 2) one mole of isodecaldehyde and two moles of mercaptopropionic acid were reacted to produce isodecane-1,1-bis (mercaptopropionic acid) as a liquid.

Example 12

Using procedure A (Example 1) one mole of acetone and two moles of mercaptoacetic acid were reacted to produce propane-2,2-bis (mercaptoacetic acid) as a solid having a melting point of 129–130° C.

Example 13

Using procedure B (Example 2) one mole of acetone and two moles of mercaptopropionic acid were reacted to produce propane-2,2-bis (mercaptopropionic acid) as a solid having a melting point of 76–78° C.

Example 14

Using procedure B (Example 2) one mole of methyl isobutyl ketone and two moles of mercaptoacetic acid were reacted to produce 4-methylpentane-2,2-bis (mercaptoacetic acid) as a solid having a melting point of 81–84° C.

Example 15

Using procedure B (Example 2) one mole of methyl ethyl ketone and two moles of mercaptoacetic acid were reacted to produce butane-2,2-bis (mercaptoacetic acid) as a solid having a melting point of 102–104° C.

Example 16

Using procedure B (Example 2) one mole of levulinic acid and two moles of mercaptopropionic acid were reacted to produce 4,4-bis (carboxyethylthio)-valeric acid as a solid having a melting point of 146–149° C. and having the formula

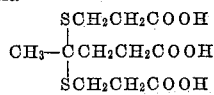

Example 17

Using procedure D one mole of levulinic acid and two moles of butyl mercaptopropionate were added to 200 ml. of toluene, 0.5 gram of p-toluenesulfonic acid added and the mixture heated under reflux. The distillation was continued until the theoretical amount of water had been collected. The toluene solution was then washed with water and the toluene removed by distillation under a vacuum (about 20 mm.). There was recovered 4,4-bis (carbobutoxyethylthio)-valeric acid as an oil having the formula

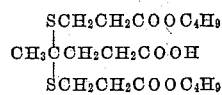

Example 18

Using procedure C one mole of levulinic acid and two moles of lauryl mercaptan were mixed together along with 0.5 gram of zinc chloride. The product obtained was a waxy solid and was further purified by recrystallization from hexane to yield 4,4-bis-(dodecylthio) valeric acid as a waxy solid.

Example 19

Using procedure D (Example 17) one mole of levulinic acid and two moles of thiophenol were added to 200 ml. of toluene and 0.5 gram of p-toluenesulfonic acid and the mixture refluxed. When the theoretical amount of water had collected the toluene solution was washed with water and the toluene removed under vacuum. There was recovered 4,4-bis-(phenylthio) valeric acid as an oil.

Example 20

Using procedure B (Example 2) one mole of ethyl acetoacetate and two moles of mercaptopropionic acid were reacted to produce ethyl-3,3-bis (carboxyethylthio)-butyrate as an oil having the formula

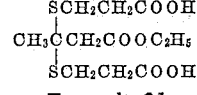

Example 21

Using procedure B (Example 2) one mole of benzophenone and two moles of mercaptopropionic acid were reacted to produce diphenylmethane-bis (mercaptopropionic acid) as a solid having a melting point of 130° C. and having the formula

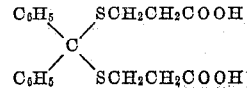

Example 22

Using procedure B (Example 2) one mole of acrolein and two moles of mercaptopropionic acid were reacted to produce propene-3,3-bis (mercaptopropionic acid) as a waxy solid having the formula $$CH_2=CHCH\begin{matrix}SCH_2CH_2COOH\\SCH_2CH_2COOH\end{matrix}$$

Example 23

Using procedure B (Example 2) one mole of crotonaldehyde and two moles of mercaptopropionic acid were reacted to produce 2-butene-1,1-bis (mercaptopropionic acid) as a waxy solid.

Example 24

Using procedure B (Example 2) one mole of glyoxal and four moles of mercaptopropionic acid were reacted to produce ethane-1,1,2,2-tetrakis-(mercaptopropionic acid) as a solid having a melting point of 162° C. and having the formula $$\begin{matrix}HOOCCH_2CH_2-S\\\\HOOCCH_2CH_2-S\end{matrix}CHCH\begin{matrix}SCH_2CH_2COOH\\\\SCH_2CH_2COOH\end{matrix}$$

Example 25

Using procedure B (Example 2) one mole of acetone and two moles of mercaptosuccinic acid were reacted to produce propane-2,2-bis (mercaptosuccinic acid) as a waxy solid having the formula $$\begin{matrix}&CH_2COOH\\&|\\CH_3&SCHCOOH\\\setminus&/\\&C\\/&\setminus\\CH_3&SCHCOOH\\&|\\&CH_2COOH\end{matrix}$$

Example 26

Using procedure D (Example 17) one mole of salicylaldehyde and two moles of 2-mercaptobenzoic acid were added to 200 ml. of toluene and 0.5 gram of p-toluenesulfonic acid and the mixture refluxed. When the theoretcial amount of water had collected the toluene solution was washed with water and the toluene removed under vacuum. There was recovered 2-hydroxybenzaldi (2'-mercaptobenzoic acid) as a solid having the melting point 141-145° C. and having the formula

Example 27

Using procedure B (Example 2) one mole of 37% aqueous formaldehyde was reacted with one mole of dodeycl mercaptan and one mole of mercaptoacetic acid to produce dodecylthiomethylthioacetic acid.

The compounds in groups I, Ia, II, III, IV, and V can be prepared by any of procedures E to H below.

PROCEDURE E

Equimolar quantities of dialkyl tin oxide (or diaryl tin oxide or diaralkyl tin oxide) and the bis (mercaptoalkanoic acid) or similar compound were heated under reflux in 300 ml. of toluene until the calculated quantity of water (one equivalent) had collected. The reaction mixture was filtered warm and stripped of solvent under reduced pressure (e.g. 20 mm.). The residue normally solidified on standing. The products can be further purified by trituration with hexane.

PROCEDURE F

A mixture of one equivalent of carbonyl compound and two equivalents of mercaptoalkanoic acid or similar compound were heated under reflux in 300 ml. of toluene, containing a catalytic quantity, e.g. 0.5 gram, of p-toluenesulfonic acid until the calucuated quantity (one equivalent) of water had collected. One equivalent of dialkyl tin oxide (or diaryl tin oxide or diaralkyl tin oxide) was then added and reflux continued until a second equivalent of water had distilled. The product was then filtered warm and the solvent removed under reduced pressure.

PROCEDURE G

A solution of one mole of dialkyl tin dihalide in 300 ml. of ether was shaken with two moles of 50% aqueous sodium hydroxide to form the dialkyl tin hydroxide. The ethereal solution was then poured into a solution of one mole of bis (mercaptoalkanoic acid) mercaptal (or other mercaptal) in 200 ml. of acetone and filtered. The product was isolated by evaporation of the solvent and trituration of the residue with hexane. Diaryl tin dihalides can be used in place of the dialkyl tin dihalides.

PROCEDURE H

The mercaptoalkanoic acid (or similar compound) was treated with an amount of the dialkyl tin oxide (or diaryl tin oxide or diaralkyl tin oxide) sufficient to give a neutral tin salt (e.g. 1 mole of a mercaptoalkanedioic acid for each mole of dialkyl tin oxide). Then 300 ml. of benzene or toluene was added and the mixture was refluxed under a moisture trap until the calculated quantity of water had been removed. The solvent was stripped and the product crystallized if solid and remained as a high boiling residue, if liquid.

Example 28

One mole of dibutyl tin oxide and one mole of propane-2,2-bis (mercaptopropionic acid) were heated under reflux in 300 ml. of toluene until one mole of water had collected. The reaction mixture was filtered warm and stripped of toluene under reduced pressure (20 mm.) to yield dibutyl tin propane-2,2-bis (mercaptopropionate) of the formula $$\begin{matrix}C_4H_9\\\setminus\\\;\;\;Sn\\/\\C_4H_9\end{matrix}\begin{matrix}OOCCH_2CH_2S\\\\OOCCH_2CH_2S\end{matrix}\begin{matrix}CH_3\\\setminus\\\;\;C\\/\\CH_3\end{matrix}$$

as a solid having a melting point of 58-60° C.

Example 29

Using procedure E (Example 28) one mole of dibutyl tin oxide and one mole of benzaldi (mercaptoacetic acid) were reacted to produce dibutyl tin benzaldi (mercaptoacetate) of the formula $$\begin{matrix}C_4H_9\\\setminus\\\;\;\;Sn\\/\\C_4H_9\end{matrix}\begin{matrix}OOCCH_2S\\\\OOCCH_2S\end{matrix}HC-\bigcirc$$

as a solid having a melting point of 157-162° C.

Example 30

Using procedure E (Example 28) one mole of dibutyl tin oxide and one mole of benzaldi (mercaptopropionic acid) were reacted to produce dibutyl in benbaldi (mercaptopropionate) as a solid having a melting point of 79-89 C.

Example 31

A mixture of one mole of salicylaldehyde and two moles of mercaptopropionic acid were heated under reflux in 300 mol. of toluene containing 0.5 gram of p-toluenesulfonic acid until one mole of water had collected. Then one mole of dibutyl tin oxide was added and refluxing continued until a second mole of water had distilled. The warm mixture was filtered and the solvent removed in a vacuum (20 mm.) to yield dibutyl tin 2-hydroxy-benzaldi (mercaptoproprionate) as a solid having a melting point of 131–134° C. and having the formula

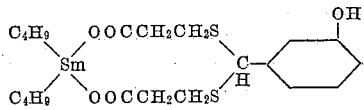

Example 32

A solution of one mole of dineopentyl tin dibromide in 300 ml. of ether was shaken with two moles of 50% aqueous sodium hydroxide. The ethereal solution was then poured into a solution of one mole of propane-2,2-bis (mercaptopropionic acid) in 200 ml. of acetone and filtered. The product was isolated by evaporation of the solvents and trituration of the residue with hexane. The product was dineopentyltin propane-2,2-bis (mercaptopropionate).

Example 33

One mole of isodecane-1,1-bis (mercaptopropionic acid) and one mole of dibutyl tin oxide were added to 300 ml. of toluene and the mixture refluxed under a moisture trap until one mole of water was removed. The solvent was then stripped off and dibutyl tin isodecane-1,1-bis (mercaptopropionate) recovered as the product.

Example 34

Using procedure H (Example 33) one mole of (dioctyl tin oxide and one mole of propane-2,2-bis (mercaptopropionic acid) were reacted in toluene as the solvent and dioctyl tin propane-2,2-bis (mercaptopropionate) recovered as a high boiling liquid.

Example 35

Using procedure E (Example 28) one mole of dibutyl tin oxide and one mole of propane-2,2-bis (mercaptosuccinic acid) were reacted to produce dibutyl tin propane-2,2-bis (mercaptosuccinate) having the formula

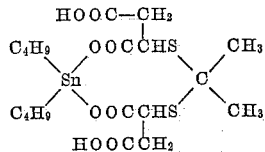

Example 36

Using procedure H (Example 33) one mole of dioctyl tin oxide and two moles of 4,4-bis (carbobutoxyethylthio) valeric acid were reacted in toluene as the solvent and there was recovered dioctyl tin di [4,4-bis (carbobutoxyethylthio) valerate] as the product.

Example 37

Using procedure E (Example 28) one mole of dibutyl tin oxide and one mole of 2-hydroxybenzaldi (2′-mercaptobenzoic acid) were reacted to produce dibutyl tin 2-hydroxybenzaldi (2′-mercaptobenzoate).

Example 38

Using procedure H (Example 33) one mole of diphenyl tin oxide and one mole of benzylthiomethylthioacetic acid were reacted to produce diphenyl tin di (benzylthiomethylthioacetate).

Example 39

Using procedure H (Example 33) two moles of dibutyl tin oxide and one mole of ethane-1,1,2,2-tetrakis (mercaptopropionic acid) were reacted to produce di (dibutyl tin) ethane 1,1,2,2-tetrakis (mercaptopropionate).

The stabilizers of the present invention can be used with halogen containing vinyl and vinylidene resins in which the halogen is attached directly to the carbon atoms.

Preferably, the resin is a vinyl halide resin, specifically, a vinyl chloride resin. Usually, the vinyl chloride resin is made from monomers consisting of vinyl chloride alone or a mixture of monomers comprising at least 70% vinyl chloride by weight. When vinyl chloride copolymers are stabilized, preferably the copolymer of vinyl chloride with an ethylenically unsaturated compound copolymerizable therewith contains at least 10% of polymerized vinyl chloride.

As the chlorinated resin there can be employed chlorinated polyethylene having 14 to 75%, e.g., 27%, chlorine by weight, polyvinyl chloride, polyvinylidene chloride, polyvinyl bromide, polyvinyl fluoride, copolymers of vinyl chloride with 1 to 90%, preferably 1 to 30%, of a copolymerizable ethylenically unsaturated material such as vinyl acetate, vinyl butyrate, vinyl benzoate, vinylidene chloride, diethyl fumarate, diethyl maleate, other alkyl fumarates and maleates, vinyl propionate, methyl acrylate, 2-ethylhexyl acrylate, butyl acrylate and other alkyl acrylates, methyl methacrylate, ethyl methacrylate, butyl methacrylate and other alkyl methacrylates, methyl alpha chloroacrylate, styrene, trichloroethylene, vinyl ethers such as vinyl ethyl ether, vinyl chloroethyl ether and vinyl phenyl ether, vinyl ketones such as vinyl methyl ketone and vinyl phenyl ketone, 1-fluoro-1-chloroethylene, acrylonitrile, chloroacrylonitrile, allylidene diacetate and chloroallylidene diacetate. Typical copolymers include vinyl chloride-vinyl acetate (96:4 sold commercially as VYNW), vinyl chloride-vinylacetate (87:13), vinyl chloride-vinyl acetate-maleic anhydride (86:13:1), vinyl chloride-vinylidene chloride (95:5), vinyl chloride-diethyl fumarate (95:5), vinyl chloride-trichloroethylene (95:5), vinyl chloride-2-ethylhexyl acrylate (80:20).

The stabilizers of the present invention can be incorporated with the resin by admixing in an appropriate mill or mixer or by any of the other well-known methods which provide for uniform distribution throughout the resin compositions. Thus, mixing can be accomplished by milling on rolls at 100–160° C.

In addition to the novel stabilizers there can also be incorporated with the resin conventional additives such as plasticizers, pigments, fillers, dyes, ultraviolet light absorbing agents, densifying agents and the like.

If a plasticizer is employed, it is used in conventional amount, e.g., 30 to 150 parts per 100 parts of resin. Typical plasticizers are di-2-ethylhexyl phthalate, dibutyl sebacate, dioctyl sebacate, tricresyl phosphate.

The tin containing stabilizers in groups I, Ia, II, III, IV and V are normally used in an amount of 0.01 to 10% by weight of the resin. More preferably 0.2 to 5% of the tin compound is used by weight of the resin.

When a mixture of dihydrocarbon tin oxide or sulfide is employed with the thioacetals or ketals of groups VI, VIa, VII, VIII, IX and X there is normally used 0.01 to 10% of the tin oxide or sulfide by weight of the resin and the thioacetal or thioketal is also normally used in an amount of 0.01 to 10% by weight of the resin. More preferably 0.2 to 5% of the tin compound and 0.2 to 5% of the thioacetals or thioketal is employed based on the weight of the resin.

In the following examples employing the stabilizers of the present invention with vinyl chloride resins without exception there was greater stabilization than when the equivalent amount of dibutyl tin dilaurate was employed. Many of the compounds and compositions were superior to dibutyl tin bis(isooctylthioglycolate) as stabilizers for vinyl chloride resins.

The following examples (except comparison Examples 40 and 41) illustrate the stabilizing effect of the additives of the present invention. It should be noted that the first yellowing does not necessarily limit the usefulness of the stabilizer. The stabilizer tests were carried out at 360° F. (216° C.) in the conventional forced draft oven. In the tables 101 EP and 103 EP designate Geon 101 EP and Geon 103 EP which are vinyl chloride homopolymers manufactured by B. F. Goodrich. VYNW designates a 96:4 vinyl chloride-vinyl acetate copolymer and St. Gobain, a commercially available vinyl chloride resin. In the tests all parts are expressed as parts per 100 parts by weight of the resin. The letter Y designates the time in minutes at which color first appeared. The letter B designates the time in minutes at which the resin became very dark.

Example 40

[Dibutyl tin dilaurate—molecular weight 528]

| Parts stabilizer | 0.95 | 0.94 | 1.88 | 2.82 |
|---|---|---|---|---|
| Resin | 103 EP | 101 EP | 103 EP | 103 EP |
| Dioctyl phthalate (parts) | 0 | 50 | 50 | 50 |
| Results | Y—0 B—60 | Y—15 B—45 | Y—30 B—75 | Y—0 B—75 |

Example 41

[Dibutyl tin (isooctylthioglycolate)—molecular weight 580]

| Parts stabilizer | 0.94 | 0.775 | 0.95 | 1.0 | 1.67 | 1.11 |
|---|---|---|---|---|---|---|
| Resin | 103 EP | 103 EP | 103 EP | 101 EP | VYNW | (¹) |
| Dioctyl phthalate (parts) | 50 | 50 | 0 | 0 | 0 | 50 |
| Results | Y—45 B—90 | Y—45 B—75 | Y—45 B—60 | Y—30 B—75 | Y—75 B—75 | Y—60 B—75 |

¹ St. Gobain.

Example 42

[Dibutyl tin isodecane-1,1-bis (mercaptopropionate)—molecular weight 580]

Parts stabilizer _____ 0.86
Resin _____ 103 EP
Results _____ Y—45, B—75.

Example 43

[Dibutyl tin benzaldi (mercaptopropionate)—molecular weight 530]

Parts stabilizer _____ 1.60
Resin _____ 103 EP
Dioctyl phthalate (parts) _____ 50
Results _____ Y—75, B—120

Example 44

[Dioctyl tin propane-2,2-bis (mercaptopropionate)—molecular weight 594]

| Parts stabilizer | 0.875 | 0.453 | 0.453 |
|---|---|---|---|
| Epoxidized soya oil | 0 | 0 | 5 |
| Epoxidized isoctyl oleate | 0.875 | 0.453 | 0.453 |
| Resin | 103 EP | 101 EP | 101 EP |
| Results | Y—75 B—105 | Y—75 B—90 | Y—75 B—135 |

Example 45

[Dibutyl tin benzaldi (mercaptoacetate)—molecular weight 502]

| Parts stabilizer | 0.75 | 1.5 | 0.75 | 0.75 | 1.48 | 1.48 |
|---|---|---|---|---|---|---|
| Resin | 103 EP | 103 EP | 103 EP | 103 EP | 103 EP | 103 EP |
| Dioctyl phthalate (parts) | 0 | 0 | 50 | 0 | 50 | 0 |
| Tricresyl phosphate (parts) | 0 | 0 | 0 | 0 | 0 | 50 |
| Results | Y—60 B—75 | Y—60 B—120 | Y—15 B—75 | Y—45 B—75 | Y—30 B—165 | Y—30 B—165 |

Example 46

Dibutyl tin propane-2,2-bis (mercaptopropionate)—molecular weight 482]

| Parts stabilizer | 0.715 | 1.07 | 0.72 | 0.715 | 0.905 |
|---|---|---|---|---|---|
| Epoxidized soya oil | 0 | 0 | 5 | 0 | 0 |
| Resin | 103 EP | VYNW | 101 EP | 101 EP | 103 EP |
| Dioctyl phthalate | 50 | 0 | 0 | 0 | 0 |
| Results | Y—90 B—105 | Y—75 B—75 | Y—75 B—120 | Y—75 B—90 | Y—75 B—75 |

Example 47

(Compound: Benzaldi bis (mercaptopropionic acid)—molecular weight 300)

| Dibutyl tin oxide (parts) | 0.74 | 0.74 | 0.74 | 0.74 | 0.74 | 0.74 | 0.37 | 0.37 | 0.37 | 0.37 | 0.37 |
|---|---|---|---|---|---|---|---|---|---|---|---|
| Above compound (parts) | 0.88 | 0.45 | 0.88 | 0.45 | 0.49 | 0.25 | 0.30 | 0.46 | 0.23 | 0.46 |
| Resin | 103 EP | 103 EP | 103 EP | 103 EP | 103 EP | 103 EP | 103 EP | 101 EP | 101 EP | 101 EP | 101 EP |
| Dioctyl phthalate (parts) | 50 | 50 | 50 | 50 | 0 | 50 | 0 | 0 | 0 | 0 | 50 |
| Tricresyl phosphate (parts) | 0 | 0 | 0 | 0 | 50 | 0 | 50 | 0 | 0 | 0 | 0 |
| Results | Y—75 B—135 | Y—90 B—135 | Y—60 B—165 | Y—120 B—165 | Y—60 B—165 | Y—75 B—155 | Y—15 B—105 | Y—30 B—75 | Y—30 B—75 | Y—60 B—75 | Y—30 B—90 |

Example 48

(Compound: O-hydroxybenzaldi (mercaptopropionic acid)—molecular weight 316)

| Dibutyl tin oxide | 0.74 | 0.74 | 0.74 | 0.37 | 0.37 | 0.37 | 0.37 | 0.37 | 0.37 | 0.37 | 0.555 | 0.37 |
|---|---|---|---|---|---|---|---|---|---|---|---|---|
| Above compound | 0.59 | 0.59 | 0.59 | 0.30 | 0.275 | 0.26 | 0.30 | 0.32 | 0.35 | 0.50 | 0.77 | 0.475 | 0.44 |
| Resin | ¹103 | ¹103 | ¹103 | (²) | ¹103 | ¹103 | (²) | ¹101 | ¹103 | ¹103 | ¹101 | ¹101 | ¹101 |
| Dioctyl phthalate | 50 | 50 | 0 | 50 | 50 | 0 | 0 | 0 | 0 | 0 | 0 | 0 | 50 |
| Tricresyl phosphate | 0 | 0 | 50 | 0 | 0 | 50 | 0 | 0 | 0 | 0 | 0 | 0 | 0 |
| Results | Y—90 B—135 | Y—90 ³B—165 | Y—60 B—75 | Y—75 B—120 | Y—90 B—120 | Y—60 B—105 | Y—60 B—105 | Y—30 B—75 | Y—15 B—90 | Y—30 B—90 | Y—15 B—120 | Y—30 B—90 | Y—75 B—105 |

¹ EP.  ² St. Gobain.
³ Indicates resin was not very dark when test was terminated after 165 minutes.

Example 49

[Compound: Isodecane-1,1-bis (mercaptoacetic acid)—mol. wt. 322]

Dibutyl tin oxide _____ 0.37
Above compound _____ 0.50
Resin _____ 101 EP
Results _____ Y—0, B—90

Example 50

[Compound: Propane-2,2-bis (mercaptoacetic acid)—mol. wt. 224]

| Dibutyl tin oxide | 0.37 | 0.37 | 0.37 | 0.37 | 0.37 |
|---|---|---|---|---|---|
| Above compound | 0.21 | 0.22 | 0.36 | 0.20 | 0.21 |
| Resin | [1]103 | (2) | [1]101 | [1]101 | [1]103 |
| Results | Y—30 B—105 | Y—15 B—90 | Y—30 B—60 | Y—15 B—60 | Y—30 B—60 |

[1] EP.   [2] St. Gobain.

Example 51

[Compound: Diphenylmethane-bis (mercaptopropionic acid)—mol. wt. 348]

| Dibutyl tin oxide | 0.37 | 0.37 | 0.37 | 0.37 | 0.37 |
|---|---|---|---|---|---|
| Above compound | 0.31 | 0.35 | 0.35 | 0.57 | 0.57 |
| Resin | [1]103 | [1]101 | [1]103 | [1]101 | [1]101 |
| Dioctyl phthalate | 0 | 0 | 0 | 0 | 50 |
| Results | Y—30 B—90 | Y—45 B—75 | Y—30 B—75 | Y—30 B—75 | Y—30 B—45 |

[1] EP.

Example 52

[Compound: Methane-bis (mercaptopropionic acid)—mol. wt. 224]

| Dibutyl tin oxide | 0.37 | 0.37 | 0.37 |
|---|---|---|---|
| Above compound | 0.19 | 0.25 | 0.34 |
| Resin | 103 EP | 103 EP | 101 EP |
| Dioctyl phthalate | 50 | 0 | 0 |
| Results | Y—30 B—75 | Y—0 B—75 | Y—0 B—75 |

Example 53

[Compound: Methane-bis (mercaptoacetic acid)—mol. wt. 196]

Dibutyl tin oxide _____ 0.37
Above compound _____ 0.20
Resin _____ 103 EP
Results _____ Y—15, B—60

Example 54

[Compound: Butane-2,2-bis (mercaptoacetic acid)—mol. wt. 248]

| Dibutyl tin oxide | 0.37 | 0.37 |
|---|---|---|
| Above compound | 0.21 | 0.40 |
| Resin | 103 EP | 101 EP |
| Results | Y—30 B—60 | Y—15 B—60 |

Example 55

[Compound: Cyclohexyl-1,1-bis (mercaptoacetic acid)—mol. wt. 264]

| Dibutyl tin oxide | 0.37 | 0.37 | 0.37 | 0.37 |
|---|---|---|---|---|
| Above compound | 0.235 | 0.40 | 0.22 | 0.40 |
| Resin | 103 EP | 101 EP | 101 EP | 101 EP |
| Dioctyl phthalate | 0 | 0 | 0 | 50 |
| Results | Y—30 B—60 | Y—15 B—60 | Y—30 B—60 | Y—30 B—75 |

Example 56

[Compound: 4,4-bis (dodecylthio) valeric acid—mol. wt. 490]

| Dibutyl tin oxide | 0.37 | 0.37 |
|---|---|---|
| Above compound | 0.56 | 0.80 |
| Resin | 103 EP | 103 EP |
| Results | Y—0 B—60 | Y—0 B—75 |

Example 57

[Compound: Isodecane-1,1-bis (mercaptopropionic acid)—mol. wt. 350]

| Dibutyl tin oxide | 0.37 | 0.37 | 0.37 |
|---|---|---|---|
| Above compound | 0.315 | 0.53 | 0.53 |
| Resin | 103 EP | 101 EP | 101 EP |
| Dioctyl phthalate | 0 | 0 | 50 |
| Results | Y—60 B—75 | Y—30 B—75 | Y—30 B—75 |

Example 58

[Compound: 4-hydroxy-3-methoxybenzaldi (mercaptopropionic acid)—molecular weight 346]

| Dibutyl tin oxide | 0.37 | 0.37 |
|---|---|---|
| Above compound | 0.36 | 0.53 |
| Resin | 103 EP | 101 EP |
| Results | Y—0 B—75 | Y—0 B—75 |

Example 59

[Compound: Propane-2,2-bis (mercaptopropionic acid)—mol. wt. 252]

| Dibutyl tin oxide | 0 | 0.37 | 0.37 | 0.37 | 0.37 |
|---|---|---|---|---|---|
| Dioctyl tin oxide | 0.54 | 0 | 0 | 0 | 0 |
| Above compound | 0.41 | 0.38 | 0.20 | 0.48 | 0.22 |
| Resin | [1]103 | [1]101 | [1]101 | [1]101 | [1]103 |
| Dioctyl phthalate | 0 | 0 | 0 | 50 | 50 |
| Results | Y—60 B—75 | Y—60 B—90 | Y—60 B—90 | Y—75 B—105 | Y—105 B—120 |

[1] EP.

Example 60

[Compound: 4,4-bis (phenylthio) valeric acid—mol. wt. 318]

| Dibutyl tin oxide | 0.37 | 0.37 |
|---|---|---|
| Above compound | 0.48 | 0.25 |
| Resin | 101 EP | 101 EP |
| Results | Y—0 B—60 | Y—0 B—60 |

Example 61

[Compound: 4,4-bis (carbobutoxyethylthio) valeric acid—mol. wt. 422]

| Dibutyl tin oxide | 0.37 | 0.37 | 0.37 |
|---|---|---|---|
| Above compound | 0.66 | 0.33 | 0.66 |
| Resin | 101 EP | 101 EP | 103 EP |
| Dioctyl phthalate | 0 | 0 | 50 |
| Results | Y—60 B—90 | Y—30 B—75 | Y—60 B—90 |

Example 62

[Compound: 4,4-bis (carboxyethylthio) valeric acid—mol. wt. 287]

| Dibutyl tin oxide | 0.37 | 0.37 | 0.37 | 0.37 |
|---|---|---|---|---|
| Above compound | 0.34 | 0.32 | 0.18 | 0.32 |
| Resin | 103 EP | 101 EP | 101 EP | 103 EP |
| Dioctyl phthalate | 50 | 0 | 0 | 50 |
| Results | Y—75 B—105 | Y—30 B—75 | Y—30 B—75 | Y—60 B—90 |

Example 63

[Compound: 2-hydroxybenzaldi (2'-mercaptobenzoic acid)—mol. wt. 392]

| Dibutyl tin oxide | 0.37 | 0.37 | 0.37 | 0.37 |
|---|---|---|---|---|
| Above compound | 0.42 | 0.37 | 0.37 | 0.70 |
| Resin | 103 EP | 101 EP | 101 EP | 103 EP |
| Dioctyl phthalate | 50 | 0 | 0 | 50 |
| Results | Y—30 B—105 | Y—0 B—60 | Y—0 B—60 | Y—15 B—60 |

Example 64

[Compound: Ethane-1,2,2-tetrakis (mercaptopropionic acid)—molecular weight 456]

Dibutyl tin oxide _____ 0.37.
Above compound _____ 0.25.
Resin _____ 103 EP.
Dioctyl phthalate _____ 50.
Results _____ Y—15, B—75.

Example 65

[Compound: cyclohexyl-1,1,-bis (mercaptopropionic acid)—mol. wt. 292]

| | | | |
|---|---|---|---|
| Dibutyl tin oxide | 0.37 | 0.37 | 0.37 |
| Above compound | 0.45 | 0.23 | 0.45 |
| Resin | 101 EP | 101 EP | 101 EP |
| Dioctyl phthalate | 0 | 0 | 50 |
| Results | Y—60 B—75 | Y—60 B—75 | Y—75 B—105 |

Example 66

[Compound: Propane-2,2-bis (mercaptosuccinic acid)—mol. wt. 340]

| | | | |
|---|---|---|---|
| Dibutyl tin oxide | 0.37 | 0.37 | 0.37 |
| Above compound | 0.51 | 0.26 | 0.51 |
| Resin | 101 EP | 101 EP | 103 EP |
| Dioctyl phthalate | 0 | 0 | 50 |
| Results | Y—30 B—75 | Y—30 B—75 | Y—45 B—115 |

Example 67

[Compound: Propene-3,3-bis (mercaptopropionic acid)—mol. wt. 250]

| | | |
|---|---|---|
| Dibutyl tin oxide | 0.37 | 0.37 |
| Above compound | 0.38 | 0.20 |
| Resin | 101 EP | 101 EP |
| Results | Y—0 B—75 | Y—0 B—75 |

Example 68

[Compound: 2-butene-1,1-bis (mercaptopropionic acid)—mol. wt. 264]

| | | |
|---|---|---|
| Dibutyl tin oxide | 0.37 | 0.37 |
| Above compound | 0.40 | 0.22 |
| Resin | 101 EP | 101 EP |
| Results | Y—0 B—75 | Y—0 B—75 |

Example 69

[Compound: Ethyl-3,3-bis (carboxyethylthio) butyrate—mol. wt. 324]

| | | | |
|---|---|---|---|
| Dibutyl tin oxide | 0.37 | 0.37 | 0.37 |
| Above compound | 0.49 | 0.26 | 0.49 |
| Resin | 101 EP | 101 EP | 103 EP |
| Dioctyl phthalate | 0 | 0 | 50 |
| Results | Y—15 B—75 | Y—30 B—75 | Y—75 B—90 |

Example 70

[Compound: Pentane-2,2,4,4-tetra (mercaptopropionic acid)—molecular weight 488]

Formula:

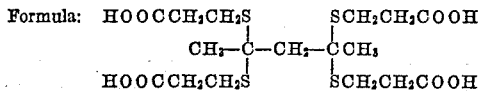

| | | |
|---|---|---|
| Dibutyl tin oxide | 0.37 | 0.37 |
| Above compound | 0.20 | 0.39 |
| Resin | 101 EP | 101 EP |
| Results | Y—15 B—75 | Y—30 B—75 |

Example 71

[Compound: Propane-2,2-bis (mercaptopropionic acid)—mol. wt. 232]

| | | | |
|---|---|---|---|
| Dibutyl tin sulfide | 0.40 | 0.40 | |
| Above compound | 0.22 | 0.22 | |
| Resin | 101 EP | 101 EP | |
| Dioctyl phthalate | 0 | 50 | |
| Results | Y—30 B—75 | Y—60 B—105 | |

Example 72

[Compound: Benzaldi (mercaptopropionic acid)—mol. wt. 300]

| | | |
|---|---|---|
| Dibutyl tin sulfide | 0.40 | 0.40 |
| Above compound | 0.26 | 0.26 |
| Resin | 101 EP | 101 EP |
| Dioctyl phthalate | 50 | 0 |
| Results | Y—75 B—105 | Y—15 B—75 |

Example 73

[Compound: Cyclohexyl-1,1-bis (mercaptopropionic acid)—mol. wt. 264]

| | | |
|---|---|---|
| Dibutyl tin sulfide | 0.40 | 0.40 |
| Above compound | 0.28 | 0.28 |
| Resin | 101 EP | 101 EP |
| Dioctyl phthalate | 0 | 50 |
| Results | Y—45 B—75 | Y—60 B—105 |

The term thioacetal as used in the claims in accordance with accepted terminology is generic to thioketals.

We claim:

1. A dihydrocarbon tetravalent tin salt of a carboxy mercaptal containing 2 to 4 carboxyl groups in the molecule and which is connected to the tin atom through oxygen.

2.

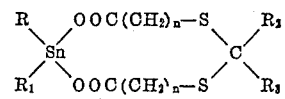

where $n$ is an integer from 1 to 8, R and $R_1$ are selected from the group consisting of alkyl, aryl and aralkyl and $R_2$ and $R_3$ are selected from the group consisting of hydrogen, alkyl, alkenyl, aryl, hydroxyaryl, aralkyl and together the pentamethylene radical.

3. A compound according to claim 2 wherein R and $R_1$ are alkyl and $n$ is an integer from 1 to 2.

4. A salt according to claim 1 having the formula

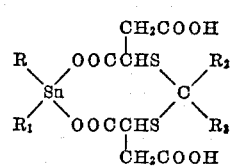

wherein R and $R_1$ are selected from the group consisting of alkyl, aryl and aralkyl and $R_2$ and $R_3$ are selected from the group consisting of hydrogen, alkyl, alkenyl, aryl, hydroxyaryl, aralkyl and together the pentamethylene radical.

5. A salt according to claim 1 having the formula

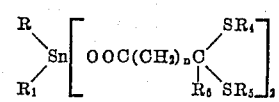

wherein R and $R_1$ are selected from the group consisting of alkyl, aryl and aralkyl, $R_4$ and $R_5$ are selected from the group consisting of alkyl, aralkyl, aryl, mercaptocarboxylic acid and mercaptocarboxylic acid ester, $R_6$ is selected from the group consisting of hydrogen, alkyl, benzyl, and aryl and $n$ is an integer from 1 to 8.

6. A salt according to claim 1 having the formula

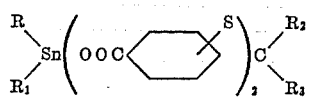

wherein R and $R_1$ are selected from the group consisting of alkyl, aryl and aralkyl and $R_2$ and $R_3$ are selected from the group consisting of hydrogen, alkyl, alkenyl, aryl, hydroxyaryl, aralkyl and together the pentamethylene radical.

7. A salt according to claim 1 having the formula

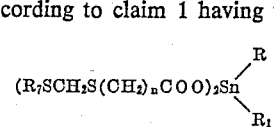

wherein R and $R_1$ are selected from the group consisting of alkyl, aryl and aralkyl and $R_7$ is selected from the group consisting of alkyl, aralkyl and aryl and $n$ is an integer from 1 to 8.

8. A salt according to claim 1 having the formula

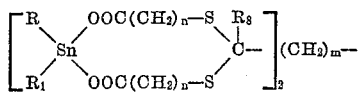

wherein R and $R_1$ are selected from the group consisting of alkyl, aryl and aralkyl and $R_8$ is selected from the group consisting of alkyl, aralkyl and aryl and $m$ is an integer from 0 to 8 and $n$ is an integer from 1 to 8.

References Cited in the file of this patent

UNITED STATES PATENTS

| | | |
|---|---|---|
| 2,786,813 | McDermott | Mar. 26, 1957 |
| 2,789,106 | Tomka et al. | Apr. 16, 1957 |
| 2,805,234 | Gloskey | Sept. 3, 1957 |
| 2,872,468 | Leistner et al. | Feb. 3, 1959 |
| 2,910,452 | Crauland | Oct. 27, 1959 |